United States Patent [19]

Jensen et al.

[11] Patent Number: 5,160,396
[45] Date of Patent: Nov. 3, 1992

[54] LOW THERMAL INERTIA HEATER

[75] Inventors: Joseph C. Jensen, Tucson; Junius E. Taylor, Phoenix, both of Ariz.

[73] Assignee: Engineering & Research Associates, Inc., Tucson, Ariz.

[21] Appl. No.: 653,892

[22] Filed: Feb. 11, 1991

[51] Int. Cl.⁵ .................................................. B29C 65/02
[52] U.S. Cl. .............................. 156/304.2; 29/611; 29/618; 156/304.6; 156/583.1; 219/10.53; 249/78; 264/40.6; 264/221; 264/317; 425/174.8 R
[58] Field of Search ............. 264/219, 220, 221, 317, 264/25, 26, 40.6; 156/272.2, 304.2, 304.6, 379.6, 583.1; 425/174.8 R, 174.8 E, 143; 249/61, 78; 219/10.53, 10.43, 10.75, 10.77; 29/602.1, 605, 611, 618

[56] References Cited

U.S. PATENT DOCUMENTS

| | | | |
|---|---|---|---|
| 2,979,773 | 4/1961 | Bolstad | 249/78 |
| 3,238,346 | 3/1966 | Savko | 219/10.53 |
| 3,322,590 | 5/1967 | Clark | 156/273 |
| 3,959,058 | 5/1976 | Rath et al. | 219/10.53 |
| 4,018,552 | 4/1977 | Prast et al. | 425/384 |
| 4,032,740 | 6/1977 | Mittelmann | 219/10.53 |
| 4,155,970 | 5/1979 | Cassell | 264/317 |
| 4,186,292 | 1/1980 | Acker | 219/10.81 |
| 4,296,293 | 10/1981 | Gerber | 219/10.53 |
| 4,390,832 | 6/1983 | Taylor | 323/273 |
| 4,454,402 | 6/1984 | Sander et al. | 219/10.53 |
| 4,490,598 | 12/1984 | Minney et al. | 219/10.81 |
| 4,563,145 | 1/1986 | de Meij | 249/78 |
| 4,574,173 | 3/1986 | Bennett | 219/10.53 |
| 4,582,057 | 4/1986 | Auth et al. | 128/303.1 |
| 4,628,168 | 12/1986 | Nebergall et al. | 219/10.81 |
| 4,641,649 | 2/1987 | Walinsky et al. | 128/303.1 |
| 4,643,186 | 2/1987 | Rosen et al. | 128/303.1 |
| 4,695,335 | 9/1987 | Lyall | 156/304.2 |
| 4,709,698 | 12/1987 | Johnston et al. | 128/303.12 |
| 4,754,752 | 7/1988 | Ginsburg et al. | 128/303.12 |
| 4,755,649 | 7/1988 | Barker et al. | 219/10.81 |
| 4,799,479 | 1/1989 | Spears | 128/303.1 |
| 4,807,620 | 2/1989 | Strul et al. | 128/303.1 |
| 4,808,164 | 2/1989 | Hess | 604/95 |
| 4,860,744 | 8/1989 | Johnson et al. | 128/303.1 |
| 4,914,267 | 4/1990 | Derbyshire | 219/85.18 |
| 4,952,357 | 8/1990 | Euteneuer | 264/317 |
| 4,954,678 | 9/1990 | Harmony et al. | 219/10.43 |
| 5,006,119 | 4/1991 | Acker et al. | 606/27 |

OTHER PUBLICATIONS

"Angioplasty—The Second Wave", *Upside Magazine*, Aug./Sep. 1990, pp. 63–66, by Dave Beal.

*Primary Examiner*—Jay H. Woo
*Assistant Examiner*—Robert B. Davis
*Attorney, Agent, or Firm*—Cahill, Sutton & Thomas

[57] ABSTRACT

A mold, having a mold cavity commensurate with the shaping, forming or welding to be made, includes an RF energized heater in close proximity to the mold cavity for heating plastic tubing placed within the mold cavity to a temperature sufficient to shape, form or weld the plastic tubing. An RF generator, electrically connected to the RF energized heater, monitors the power applied as a function of the temperature of the heater to heat the plastic tubing to a precise temperature. The mold is of thin wall construction with minimal thermal inertia to expedite both heating and cooling. Various configurations of the mold may be made to form tip shaping, forming or welding, butt welds, annular welds and the like to weld single thermoformable elements or join multiple thermoformable elements.

50 Claims, 6 Drawing Sheets

LOW THERMAL INERTIA HEATER

CROSS REFERENCE TO RELATED APPLICATIONS

The present application is related to subject matter disclosed in a patent application entitled "RF ENERGIZED AND TEMPERATURE MONITORED AND MANAGED CATHETER MOUNTED PROBE", filed on Apr. 13, 1989, and assigned Ser. No. 07/337,903, now abandoned, which application is assigned to the present assignee.

BACKGROUND OF THE INVENTION

1. Field of the Invention

The present invention relates to plastic welding and molding apparatus and, more particularly, to radio frequency (RF) heated thin wall molds for applying RF energy to heating, welding, or molding plastic elements.

2. Description of Related Art

Thermoforming of plastic material is well known and has been employed to develop tip welds in plastic tubing used for catheters. Similarly, assembly welds, such as butt welds and annular welds of plastic tubing or other plastic elements can be done by a thermowelding process.

Apparatus for effecting thermoforming may include mechanical heating elements which perform a thermoforming function primarily by heat transfer through conduction. Commensurately or in the alternative, heat transfer by radiation has been used. The presently most widely used apparatus for thermoforming constitutes the use of electrically energized inductive heating devices. Such devices are capable of performing high quality welds but suffer from several drawbacks. First, the power requirements are relatively substantial. Second, it is essentially impossible to monitor with any precision the temperature of the tubing being welded; the power applied is primarily a function of the skill of the operator based upon experience. Third, due to the relatively large mass of the apparatus, the thermal inertia is substantial, which delays both heating and cooling thereby extending production cycle time.

SUMMARY OF THE INVENTION

A mold includes a cavity commensurate with the tip forming, butt weld, annular weld or other weld to be made in thermoformable plastic. The cavity may be defined by a small number of layers of material such as polyimide or by a very thin wall metallic element. A twisted wire pair, or the like, is wrapped around the mold in proximity to the weld. RF energy is applied to the wrapping of the pair of wires to heat it. The heated wrapping instantly transmits heat through the thin layers. By minimizing the thermal inertia of the mold, a relatively small amount of power is required since most of the heat is transmitted to the material in the mold cavity and not to the mold itself. Similarly, the mold will cool rapidly after the thermoforming or thermowelding process is completed. Ancillary circuitry is electrically connected to the twisted wire pair to apply RF power. Circuitry for precisely measuring the temperature of the twisted wire pair as a function of the change in resistance due to heating and for monitoring the power output as a function of the temperature level sought to be maintained provides precise maintenance and management of the heat applied to the mold and of the temperature of the mold.

It is therefore a primary object of the present invention to provide precise temperature control and management of welding and forming apparatus for thermoformable plastic elements.

Another object of the present invention is to provide rapid heating and rapid cooling of a plastic thermoforming mold.

Still another object of the present invention is to provide apparatus for reducing the cycle time of a thermoforming mold.

Yet another object of the present invention is to provide apparatus having a very high degree of repeatability of thermoformed plastic elements.

Yet another object of the present invention is to provide a mold for circumscribing or inscribing a thermoformable plastic element to be welded, formed or molded by the mold.

A further object of the present invention is to provide safety to production personnel with apparatus having a short duration low power radiation duty cycle during thermoforming of plastic elements.

A still further object of the present invention is to provide apparatus for making uniformly high quality welds in plastic elements to dramatically reduce the likelihood of weld failure and to increase safety considerations attendant use of the welded elements.

A still further object of the present invention is to provide apparatus for thermoforming and thermowelding plastic elements with a very high rate of repeatability to enhance precision and uniformity of the thermoformed and thermowelded products.

A yet further object of the present invention is to provide a process for welding and forming thermoformable plastic elements.

A yet further object of the present invention is to provide a process for making a mold for use with thermoformable plastics.

These and other objects of the present invention will become apparent to those skilled in the art as the description thereof proceeds.

BRIEF DESCRIPTION OF THE DRAWINGS

The present invention will be described with greater specificity and clarity with reference to the following drawings, in which:

FIG. 9 illustrates a interiorly located mold for sloping and/or welding a length of plastic tubing or the like;

FIG. 10 illustrates a length of tubing having one end formed by the mold shown in FIG. 4b.

DESCRIPTION OF THE PREFERRED EMBODIMENT

Figure 1:
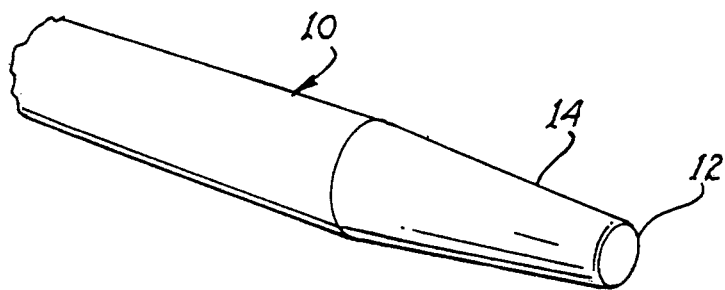
FIG. 1 illustrates a representative molded and sealed tip of a length of plastic tubing.

In various medical procedures, such as angioplasty, a length of tubing is temporarily inserted within and forced through a blood vessel to a location where a medical procedure is to be performed. To insure ease of catheter movement the end of the tubing or a lumen of a number of lumen within the tubing may be shaped and sealed. A typical length of tubing 10 having a sealed end 12 is illustrated in FIG. 1. The diameter of the tubing may be on the order of 0.079 inches (No. 6 French lumen) and the diameter at the end of the tubing may be on the order of 0.039 inches (No. 2 French lumen). Tapered segment 14 may extend for a length of $\frac{1}{2}$ to $\frac{3}{4}$ of an inch. The tubing may be made of any of several plastics, including polyvinylchlorides (PVCs), urethanes, polyethylene, polypropyline and others of similar general character and most plovro plastics.

Figure 2:
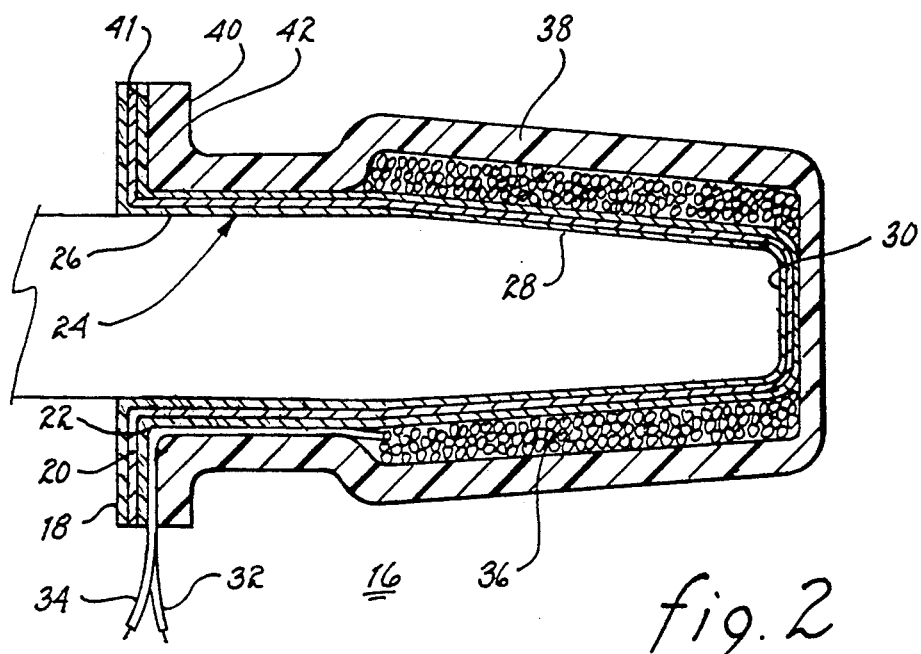
FIG. 2 illustrates a mold for shaping and sealing the tip of a length of plastic tubing illustrated in FIG. 1.

Referring to FIG. 2 there is illustrated a representative mold 16 for forming a closed end of a length of tubing 10, as illustrated in FIG. 1. A plurality of layers 18,20 and 22 define a mold cavity 24. The cavity includes a generally cylindrical section 26, a generally tapered section 28 and an end wall 30. The configuration of mold cavity 24 is equivalent to the shape of the end of tubing 10 as shown in FIG. 1. Depending on the end use of the product being formed, the end of the cavity may be shaped to develop a tip which may be tapered as shown, flattened, bulbous, rounded, etc. A length of a twisted pair of conductors 32,34 are wrapped about outermost layer 22 to form a coil, sleeve, or wrapping 36 about the mold cavity at a location where the shaping, forming or welding of the tubing elements is to be performed.

The section of tubing 10 to be heated and shaped or thermoformed is urged into tapered section 28. To achieve the thermoforming of the tip, heat is applied to the tubing. By applying RF energy from a source of RF power to wrapping 36, it will be heated. The heat from the wrapping will be transmitted through the layers to the mold cavity. Tubing 10 within the mold cavity will absorb the heat and rise in temperature. The rise in temperature and maintenance of the temperature in a narrow range is determined by the amount of RF power generated and applied by wrapping 36 to heat the tubing until it reaches the thermoforming temperature and is maintained at that temperature to permit formation of tapered segment 14. By regulating the amount of power applied, a temperature increase to cause complete melting and liquification of the plastic is prevented. Moreover, the degree of regulation and maintenance of the heat applied enhances the uniformity and repeatability of the formed or shaped product.

Figure 5:
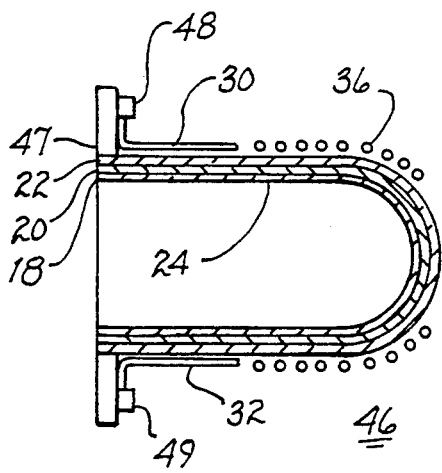
FIGS. 5 and 6 illustrate a mold formed of only a plurality of layers of polyimide.

To provide stability and rigidity to mold cavity 24 and to provide a means for securing mold 16 at an appropriate work station, an envelope 38 may be formed about the multiple layers and wrapping 36. The envelope may include a radial flange 40 or similar mechanism for structurally attaching mold 16 to a base or work station. Means for providing access to conductors 32,34 are accommodated, such as by extending the conductors from wrapping 36 intermediate layer 22 and envelope 38, as illustrated. Alternatively, flange 40 may include pads of electrically conductive material and electrically connected to conductors 32,34, as illustrated in FIG. 5. These pads may be formed or mounted on exterior side 41 or on interior side 42. By use of such pads, mold 16 can be removably maintained within a receiving cavity at a work station to secure the mold in place and to automatically electrically connect conductors 32,34 with the source of RF energy through electrically conductive wipers contacting the pads.

Figure 3:
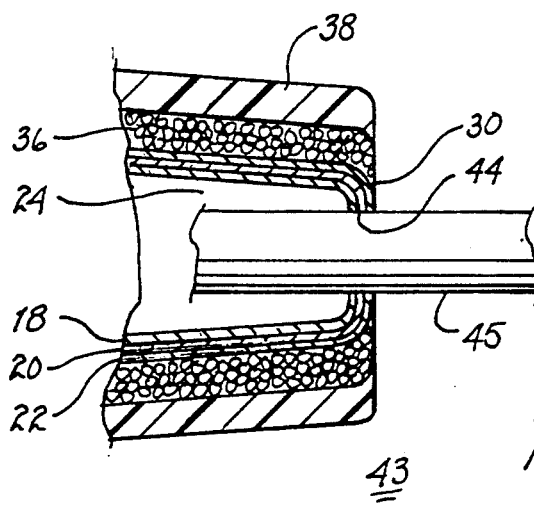
FIG. 3 illustrates a variant of the mold shown in FIG. 2.

Under certain circumstances, the end of tubing 10 might simply be necked down while maintaining the end open. A variant mold 43 illustrated in FIG. 3 provides this capability. End wall 30 is apertured by aperture 44, which essentially defines the size of the opening to be left in the tubing end. A mandrel 45 is inserted through aperture 46 for penetrable engagement with the tubing past the location of the tubing which is to be shaped formed or necked down. After insertion of the end of tubing within mold cavity 24 and penetration of the mandrel into the tubing, the tubing is heated to permit shaping/forming. The method for fabricating mold 16 may include the method depicted by the block diagram shown in FIG. 4. A zinc mandrel is formed equivalent to the size and shape of the end of tubing 10 to be shaped or formed. For example, it may include a cylindrical segment, a tapered segment and a generally flat end wall, as depicted in FIG. 1. The zinc mandrel is coated with a substrate to develop layer 18. This layer may be coated with a second substrate to form a second layer 20. Third layer 24 may be formed by coating layer 20 with further substrate. It has been found that polyimide is particularly adapted for the substrates of the present invention in that it has a melt temperature substantially above that of the plastic composition of the tubing to be formed. Secondly, it provides an essentially facile release of the thermoformed or thermowelded tubing. Third, it is relatively stable during temperature changes. Finally, it is relatively rigid to provide a spool like surface about which a twisted pair of conductors 32,34 may be wrapped.

Figure 6:
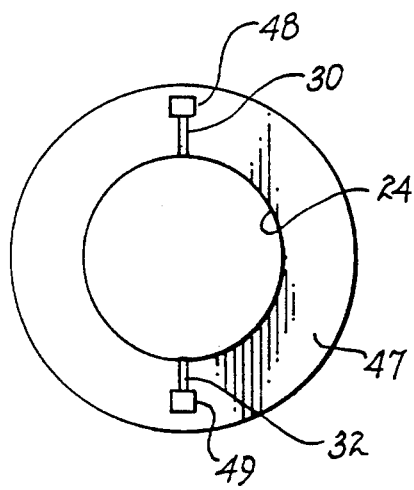

After layers 18,20 and 22 have been formed, the mandrel is removed by an etching process acting upon the zinc. After the polyimide layers have been wrapped with a twisted pair of conductors, the assembly may be secured by envelope or form 38 to provide structural rigidity, capability for handling the mold without fear of distortion and a structurally rigid element to secure the mold in place at a work station. However, as the layers of polyimide are relatively structurally robust and stable, further structural elements may not be necessary. As illustrated by mold 46 shown in FIG. 5. To provide for electrical interconnection between the conductors of the wrapping and the source of RF energy, an apertured flange 47, such as that shown in FIGS. 5 and 6, may be attached to the polyimide layers. The flange would include pads (48,49) or like elements connected to conductors 32,34. With the above described construction techniques, the outside diameter of the mold can be maintained in the range of 0.140 to 0.150 inches. The mold wall thickness overall can be in the range of 0.020 inches with the wall thickness of the layers being approximately 0.002 to 0.003 inches.

For certain applications it may be preferable to substitute a thin wall metallic mold for the plurality of layers of polyimide. Material which is readily heat transmissive, such as certain ceramic compositions, can also be used to form the mold. Wall thicknesses in the range of 0.010 to 0.015 inches have been used successfully. The conductors may be insulated with polyimide, Teflon or other electrically insulating material. The wrapping of the conductors may be stabilized with a coating of polyimide, epoxy or similar material. However, the coating should be maintained in a thin layer of minimize an increase in thermal inertia in order to maximize the heating and cooling rate of the mold. A further method of construction includes plating a mandrel of zinc with nickel (approximately 0.005 inch thickness) and adding one or more layers of polyimide for structural rigidity. The heating element can be a wrapping of a twisted pair of conductors. The mandrel would be removed by etching or other process.

Figure 7:
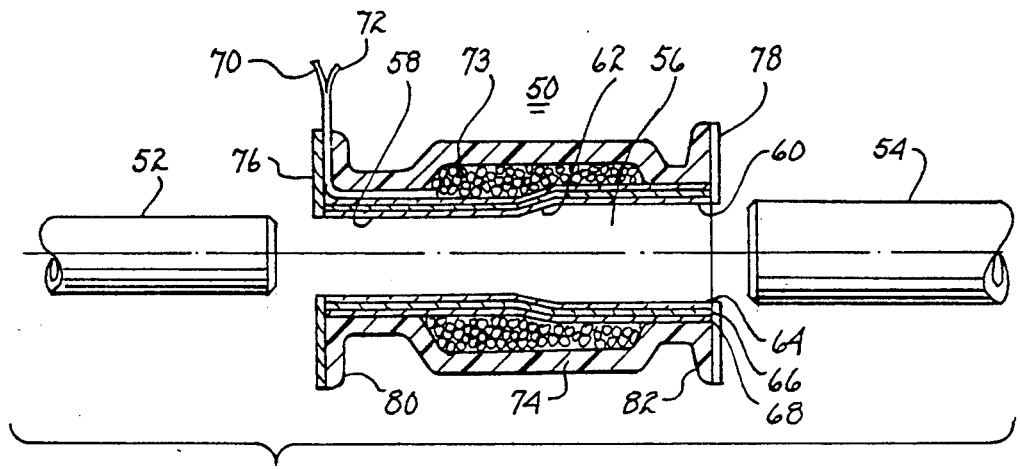
FIG. 7 illustrates a mold for butt welding and blending the ends of two dissimilar diameter lengths of tubing.

Elements for use in an angioplasty or like procedure sometimes require butt joining of tubes of different thickness and/or diameters. Referring to FIG. 7, there is illustrated a mold 50 configured to butt weld the ends of two lengths of tubing 2,54 to one another. Using a zinc mandrel as described above, a mold cavity 56 is formed. The mold cavity includes a cylindrical section 58 corresponding in diameter to that of tubing 52. A second cylindrical section 60 is formed corresponding in diameter with that of tubing 54. A transition section 62 interconnects the surface of cylindrical section 58 with the surface of cylindrical section 60. The transition section defines the external configuration of the butt weld to be formed between tubing 52 and tubing 54. This transition may be more or less abrupt than illustrated. Layers 64,66 and 68 of polyimide define mold cavity 56. Conductors 70,72 are twisted and wrapped around the mold formed by layers 64,66 and 68 in radial proximity with transition section 62. As depicted in FIG. 7, wrapping 73 may extend longitudinally along part of each of cylindrical sections 58 and 60. An envelope or form 74 may be used to surround or encapsulate layers 64,66,68 and wrapping 73; alternatively, it may be eliminated, as described above with respect to FIG. 5. Annular end walls 76,78 or the like may extend across opposed ends of envelope 74 and layers 64,66 and 68. Conductors 70,72 may be brought out from wrapping 73 intermediate one of the end walls, such as end wall 76 and envelope 74. For structural and mounting purposes, envelope 74 may include annular flanges 80,82 in addition to or in place of end walls 76,78. Whether envelope 74 is or is not used, an apertured flange 47 (see FIG. 5) may be employed to serve as an electrical interconnector and/or for mounting purposes.

In operation, to perform a butt weld, tubing 52 and 54 are inserted through respective opposed ends of mold cavity 56 into butting relationship proximate transition segment 62. Application of RF energy to wrapping 73 will heat the wrapping. In response to heating of the wrapping, heat will be transmitted through layers 64,66 and 68 and the temperature of the plastic tubing within the mold will increase sufficiently to cause adequate softening and melting of the abutting tube ends to effect a weld therebetween. By simultaneously applying opposing forces upon tubings 52,54, integration of the tubing ends with one another during the welding process will be enhanced. The exterior surface area of the weld will generally conform with transition section 62 and the corresponding portions of cylindrical section 58,60.

To add a specially constructed tip to tubing, to increase the length of the tubing, etc., it may be necessary to butt weld tubing of the same diameter. Under these circumstances mold cavity 56 would be modified to delete transition section 62 and provide cylindrical sections 58,60 with a common diameter. Other features of mold 50 would remain the same.

Figure 8:
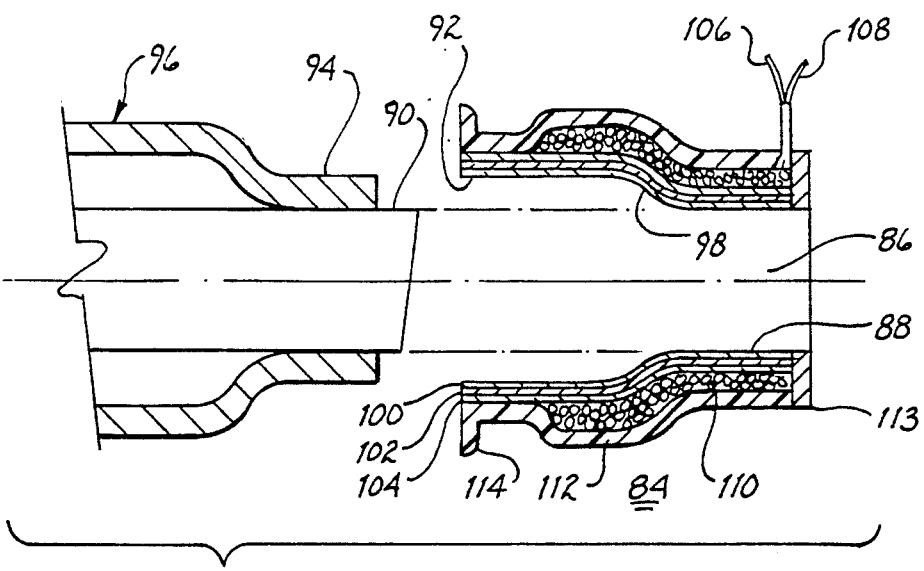
FIG. 8 illustrates a mold for annularly welding and blending the necked down end of a balloon about a length of tubing.

The present invention may be used to develop an annular weld between a circumscribed and a circumscribing length of plastic weldable material. For example, the end of a balloon used during an angioplasty procedure can be welded with a penetrably mounted length of plastic tubing. FIG. 8 illustrates a mold 84 for this purpose. Mold cavity 86 includes a cylindrical section 88 having a diameter generally commensurate with the diameter of a length of tubing 90. A cylindrical section 92 has a diameter generally commensurate with necked down end 94 of balloon 96. Transition section 98 interconnects the surface of cylindrical section 88 with the surface of cylindrical section 92 and defines the configuration of necked down end 94 upon welding of the necked down end with tubing 90; it may be more or less abrupt than the illustration.

Mold cavity 86 may be formed by use of a zinc mandrel, as described above. Layers 100,102 and 104 of polyimide, or other suitable material, are formed upon the zinc mandrel and ultimately define the mold cavity after removal of the zinc mandrel. A pair of conductors 106,108 are wrapped as a twisted pair about layers 100,102 and 104 to develop a wrapping 110. This wrapping extends across transition section 98 and may extend adjacent portions of cylindrical sections 88,92, as illustrated. To stabilize the layers and the wrapping, they may be encapsulated within an envelope or form 112. An annular end plate 113 may be used to define one end of mold 84 while an annular flange 114 of envelope 112 may be used to define the other end of the mold; end plates or annular flanges may be disposed at opposed ends of the mold. Whether envelope 112 is or is not used, an apertured flange 47 (see FIG. 5) may be employed to serve as an electrical interconnector and/or for mounting purposes.

In operation, tubing 90 is penetrably inserted through necked down end 94 of balloon 96. The combination is inserted within mold 84 through cylindrical section 92 until the necked down end interferingly engages with transition section 98. Upon applying RF energy to conductors 106,108, wrapping 110 will be heated. The heat transmitted proximate the junction between tubing 90 and necked down end 94 will heat these elements to a temperature sufficient to cause melting and welding. Accordingly, necked down end 94 will structurally and sealingly circumferentially engage tubing 90 and have an external shape commensurate with that of transition section 98.

Figures 9, 10:
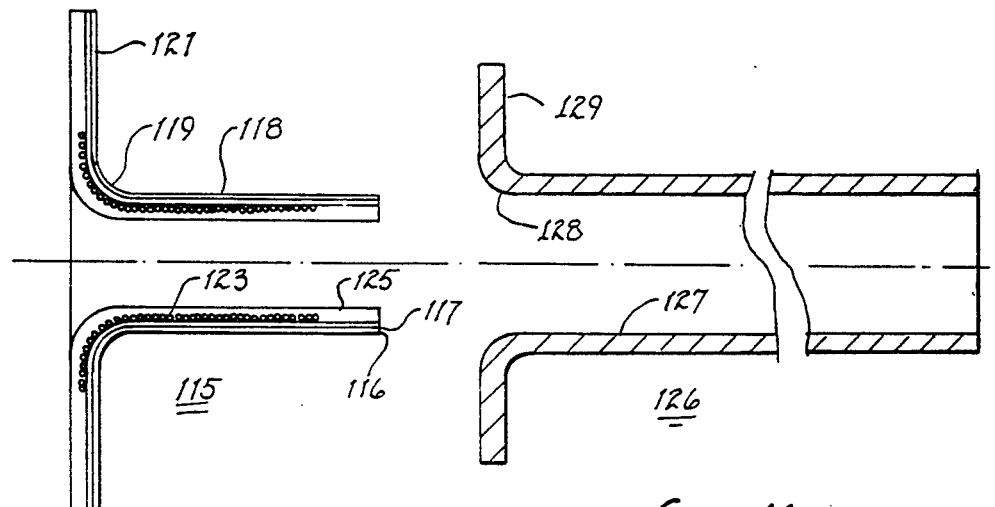

Under certain circumstances an interior (made) mold may be required to perform a welding, shaping or forming function. A mold 115 for this purpose is illustrated in FIG. 9. The mold includes one or more layers, layers 116,117 being shown, of polyimide which define the mold surface. The mold shown includes a cylindrical section 118 having a radially outwardly flared section 119 and a radial flange section 121. Such a mold configuration may be used to form or shape a flared end of a length of thermoformable tubing.

Heat for thermoforming is provided by a wrapping 123 of a pair of twisted conductors lodged adjacent and secured radially inwardly of layer 117; the wrapping may extend along flared section 119 and along part or all o radial flange section 121. Depending upon the number and thickness of layers 116, 117 additional structural integrity may be required. Such further rigidity may be implemented by one or more coatings 125 of polyimide located radially inwardly of wrapping 123 and layer 117 within cylindrical section 118. The coating may extend along flared section 119 and radial flange section 121, as illustrated.

It is to be understood that mold 115 is representative of an interior mold for welding, shaping or forming thermoplastic elements. Its shape and configuration may be varied to suit the configuration of the function to be performed.

As earlier described, layers 116, 117 etc. may be replaced by an equivalently shaped metallic shell on metallic plating. Moreover pads 46,48 (see FIG. 4) may be employed to make electrical connections between the wrapping and the source of electrical power.

FIG. 10 illustrates a form 126 upon which mold 115 may be built on fabricated. To fabricate mold 115, interior cylindrical section 127, flared section 128 and flange section 129 is coated with one or more layer of polyimide to develop layers 116, 117, etc. Wrapping 123 is adhered or otherwise secured to the coating(s) on form 126: a mandrel supporting the Wrapping may be used for this purpose. To the extent additional rigidity is required for mold 115, one or more coatings of polyimide may be applied to the adhered wrapping to form coating 125. It may be noted that the configuration shown of form 126 is representative of a length of thermoplastic tubing shaped on mold 115.

During any manufacturing process, the time and the power required are always of substantial import. By using relatively thin layers of polyimide intermediate the wrapping and the material to be welded, the source of heat will be relatively close to the weld to be made. Such close proximity requires less power for generating the quantity of heat necessary to shape or form the material or to make the weld than if the wrapping were radially further removed. The thermal inertia of the wrapping, in combination with the polyimide layers, is relatively low. The low thermal inertia minimizes the time for heating the material to be welded prior to creation of sufficient heat to develop the weld. Similarly, the low thermal inertia will enhance cooling in preparation for performing a subsequent welding operation. These benefits of rapid heating and cooling enhance the rate of production of the resulting products. The limited thermal gradient between the wrapping of any of the molds described above and the tubing or other element upon which a weld is to be made ensures a relatively uniform application of heat to the segment of material being welded. Moreover, the accuracy of heating to a set predeterminable temperature ensures material integrity, and dimensional uniformity, and repeatability of the products produced.

To enhance the rate of cooling, a source of compressed air or other gas can be directed through a nozzle to bathe the mold. The chilling effect of rapid expansion of the gas on discharge from the nozzle is particularly beneficial. A liquid could also be used to wash the mold and thereby draw off heat. Other rapidly acting and inexpensive procedures are contemplated.

Figure 11:
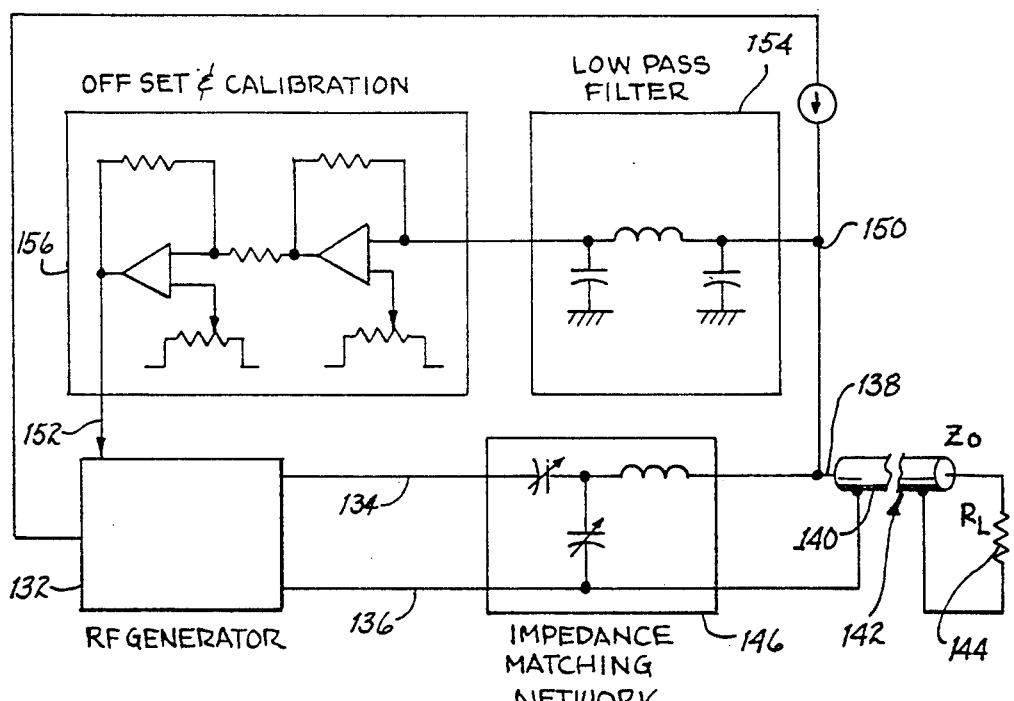
FIG. 11 illustrates a block diagram of the RF power source useable with one of the illustrated molds.
Figure 12A:
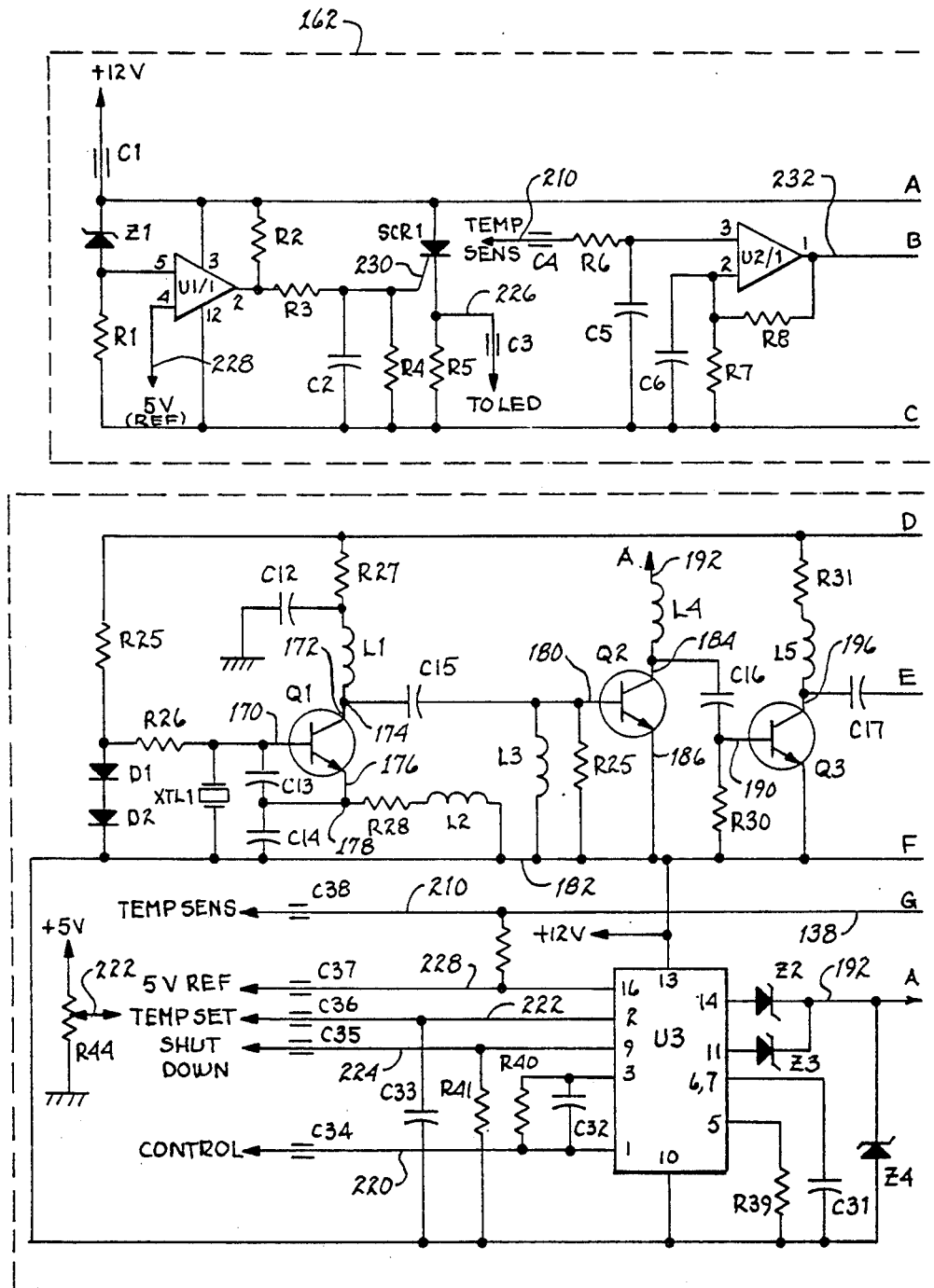
FIGS. 12a and 12b illustrate circuits represented in FIG. 6.
Figure 12B:
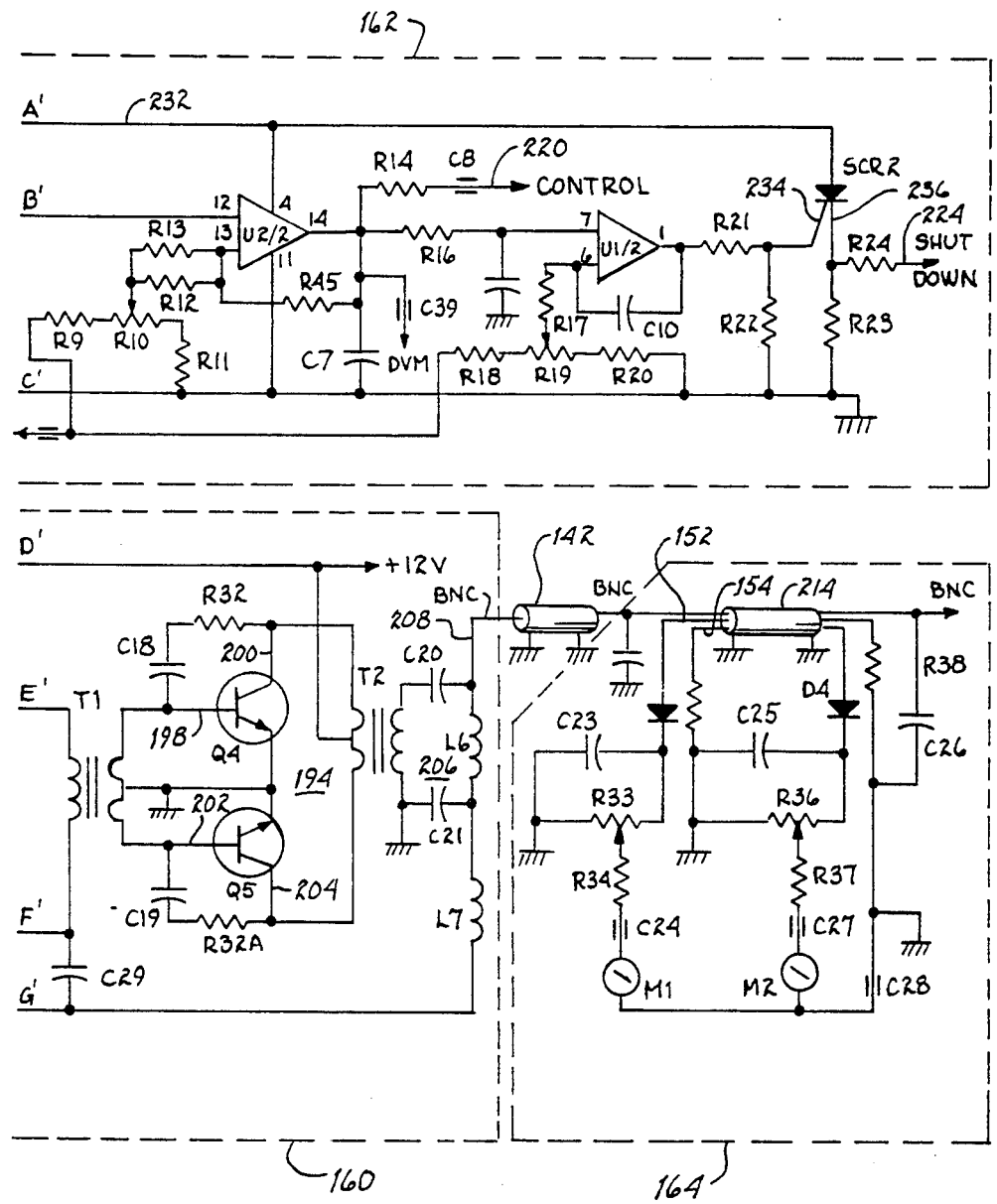

Referring to FIGS. 11, 12a and 12b, there is illustrated a circuit in block form and in detail, respectively, for generating an RF signal usable in conjunction with any of the above described molds or variants thereof. The circuit is an AC or DC powered RF generator with voltage responsive circuitry to heat, monitor and maintain a constant and presetable temperature of the healable wrapping (load) with the capability of initially temperature calibrating the load and subsequently maintaining the load temperature during use at a preset and/or user managed temperature. The benefits available from this circuit include: (1) to provide exact energy to heat the wrapping; (2) to maintain a constant and presetable temperature of the wrapping; and (3) to provide temperature calibration of the wrapping immediately prior to use to insure temperature accuracy during the shaping, forming or welding procedure.

To provide an overview, the philosophical considerations and generalized operation will be discussed first. Radio frequency (RF) energy is provided to heat the wrapping. This energy is generated by an energy source and transmitted through transmission media, such as a coaxial cable. The electrical resistance of the wrapping must change as a function of temperature. By measuring this resistance change, it is possible to determine the temperature or to correlate the temperature with a change in resistance. The resistance of the wrapping can be measured by applying a constant DC current or a relatively low frequency constant AC current through the transmission media to the load. The DC current or low frequency AC current can be isolated from the RF energy transmitted by use of a low pass filter or by time multiplexing techniques. By providing a constant current source for the DC current or low frequency AC current, a change in electrical resistance of the wrapping as a function of the temperature (resistance) of the wrapping will produce a voltage responsive to the change in resistance. This voltage change can be sensed and the change is used to regulate the power of the RF energy applied to the wrapping.

More specifically, the temperature of the wrapping is maintained constant independently of the tubing or other elements having various masses and thermal conductivities which are proximate to the wrapping. To maintain the temperature constant, a greater or lesser quantity of RF energy is transmitted to the wrapping via the coaxial cable.

It is a characteristic of ohmic conductors to change electrical conductivity with temperature. The temperature coefficient, $\alpha$, varies with each element type and is, in general, non linear. It may be expressed as $\alpha = 1/\rho \, d\rho/dT$, where $\rho$ is an element of electrical resistivity. It is generally true that over a finite temperature range, linearity can be approximated and the resistance of a load can be expressed as $R = \alpha T$.

Measuring the resistance while applying RF energy may be accomplished by applying a constant current through the coaxial cable while isolating this current from the applied RF signal with a low pass filter. Instead of using a low pass filter, the two signals can be time interleaved or otherwise multiplexed. The voltage at the constant current source is proportional to the load resistance, as expressed in the following equation: $V_o = IR_T = I(R_c + \alpha T) = I(R_c + 1/\rho \, d\rho/dT \, T)$, where $R_c$ represents the DC resistance of the coaxial cable.

Figure 4:
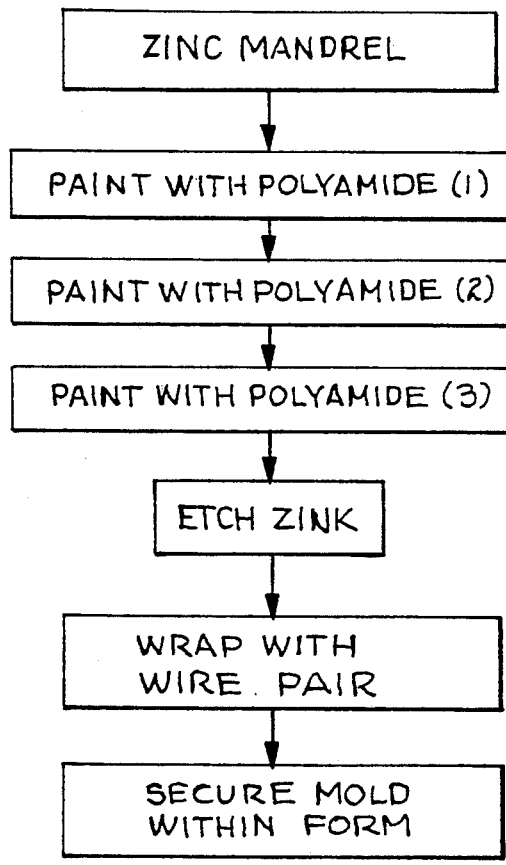
FIG. 4 illustrates a block diagram of a process for forming one of the type of molds illustrated.

Referring to FIG. 11, circuit 130 includes an RF generator 132 for delivering RF energy through conductors 134,136 to conductor 138 and shield 140 of coaxial cable 142, which coaxial cable is connected to a twisted pair of conductors such as (40,42/70,72/120,122) shown in FIGS. 2, 3 and 4. The wrapping (44,74 or 124) to be heated is represented by resistor 144 and designated by the symbol $R_L$. The impedance of the coaxial cable is represented by the symbol Zo. So that various load resistances and various cable impedances may be used, an impedance matching network ensures the delivery of maximum available energy or power. Consequently, an impedance matching network 146 is disposed between RF generator 132 and coaxial cable 142. A DC current or low frequency AC current is applied to coaxial conductor 138 through conductor 150. The voltage on conductor 150 will vary as a function of the change in resistance of the load, $R_L$. This change in voltage is applied through conductor 152 to RF generator 132 to vary the output of the RF generator correspondingly. Low pass filter 154 is employed to isolate the temperature sensing signal (voltage from the PC or AC current source) from the RF energy applied to heat the load. An offset and calibration network 156 is employed to zero out the impedance of coaxial cable 142, which impedance remains essentially constant. The circuit also calibrates a change in voltage with the temperature of the load. As depicted, operational amplifiers may be used to perform the functions of offset and calibration.

Referring to FIGS. 12a and 12b, there is shown component details of circuit 130 illustrated in FIG. 11. Circuit 130 includes three distinct sections: RF generator 160, monitor and control circuitry 162 and reflectometer 164. These three circuits are identified by three boxes of dashed lines correspondingly numerically identified. To assist one skilled in the art of circuit design and interpretation, each of the components are numbered in accordance with the following legend: resistors—R; capacitors—C; inductors—L; diodes—D; Zener diodes and Schottky barrier rectifiers—Z; silicon controlled rectifiers—SCR; crystal—XTL; transistor—Q; coaxial connector—BNC; integrated circuit or operational amplifier—U; transformer—T; reference voltage—Ref; light emitting diode LED; meter—M; and, digital volt meter—DVM. Tables 1 to 3 below list the values of the respective components along with other identifying criteria for an operative and tested embodiment of circuit 130. Experiments with this circuit indicate that it will maintain a wrapping at a setable temperature despite changes in temperature or heat transmissivity of the mold and tubing used therewith.

TABLE 1

| R1 | 1.2kΩ | ¼ W metal film |
|---|---|---|
| R2 | 3.3kΩ | ¼ W metal film |
| R3 | 1kΩ | ¼ W metal film |
| R4 | 5.1kΩ | ¼ W metal film |
| R5 | 100Ω | ¼ W metal film |
| R6 | 47kΩ | ¼ W metal film |
| R7 | 1kΩ | ¼ W metal film |
| R8 | 100kΩ | ¼ W metal film |
| R9 | 4.7kΩ | ¼ W metal film |
| R10 | 200Ω | Potentiometer |
| R11 | 200Ω | ¼ W metal film |
| R12 | 6.2kΩ | ¼ W metal film |
| R13 | 8.2kΩ | ¼ W metal film |
| R14 | 10kΩ | ¼ W metal film |
| R16 | 33kΩ | ¼ W metal film |
| R17 | 2.7kΩ | ¼ W metal film |
| R18 | 5.6kΩ | ¼ W metal film |
| R19 | 5kΩ | Potentiometer |
| R20 | 680Ω | ¼ W metal film |
| R21 | 470Ω | ¼ W metal film |
| R22 | 1kΩ | ¼ W metal film |
| R23 | 220Ω | ¼ W metal film |
| R24 | 100Ω | ¼ W metal film |
| R25 | 1.2kΩ | ¼ W metal film |
| R26 | 1.2kΩ | ¼ W metal film |
| R27 | 47Ω | ¼ W metal film |
| R28 | 10Ω | ¼ W metal film |
| R29 | 82Ω | ¼ W metal film |
| R30 | 10Ω | ¼ W metal film |
| R31 | 10Ω | ¼ W metal film |
| R32 | 100Ω | ¼ W metal film |
| R32A | 100Ω | ¼ W metal film |

TABLE 1-continued

| R33 | 5kΩ | Potentiometer |
|---|---|---|
| R34 | 33kΩ | ¼ W metal film |
| R35 | 51Ω | ¼ W metal film |
| R36 | 5kΩ | Potentiometer |
| R37 | 33kΩ | ¼ W metal film |
| R38 | 51ΩΩ | ¼ W metal film |
| R39 | 18kΩ | ¼ W metal film |
| R40 | 22kΩ | ¼ W metal film |
| R41 | 100Ω | ¼ W metal film |
| R42 | 10kΩ | ¼ W metal film |
| R43 | 1.2kΩ | ¼ W metal film |
| R44 | 5kΩ | Potentiometer |
| R45 | 10kΩ | ¼ W metal film |

TABLE 2

| C1 | 1500 pf, 500V feed thru, 327-005 × 5U0 − 152 M |
|---|---|
| C2 | 4.7 μfd, 25V, A/ electrolytic |
| C3 | 1500 pf, 500V feed thru, 327-005 × 5U0 − 152 M |
| C4 | 1500 pf, 500V feed thru, 327-005 × 5U0 − 152 M |
| C5 | 0.1 μfd, 50V, CK 05 BX 104 |
| C6 | 0.1 μfd, 50V, CK 05 BX 104 |
| C7 | 0.1 μfd, 50V, CK 05 BX 104 |
| C8 | 1500 pf, 500V feed thru, 327-005 × 5U0 − 152 M |
| C9 | 0.1 μfd, 50V, CK 05 BX 104 |
| C10 | 0.1 μfd, 50V, CK 05 BX 104 |
| C11 | 1500 pf, 500V feed thru, 327-005 × 5U0 − 152 M |
| C12 | 0.1 μfd, 50V, CK 05 BX 104 |
| C13 | 27 pf Type DM 10 5% |
| C14 | 27 pf Type DM 10 5% |
| C15 | 100 pf, DIP MICA, DM 10 |
| C16 | 100 pf, DIP MICA, DM 10 |
| C17 | 100 pf, DIP MICA, DM 10 |
| C18 | 0.01 μfd, 500V, DISC CERAMIC |
| C19 | 0.01 μfd, 500V, DISC CERAMIC |
| C20 | 680 pf, DIP MICA, DM 15 |
| C21 | 0.1 μfd, 50V, CK 05 BX 104 |
| C22 | 18 pf, DIP MICA, DM 10 |
| C23 | 0.01 μfd, 100V, DISC CERAMIC |
| C24 | 1500 pf, 500V feed thru, 327-005 × 5U0 − 152 M |
| C25 | .01 μfd, 100V, DISC CERAMIC |
| C26 | 18 pf, DIP MICA, DM 10 |
| C27 | 1500 pf, 500V feed thru, 327-005 × 5U0 − 152 M |
| C28 | 1500 pf, 500V feed thru, 327-005 × 5U0 − 152 M |
| C29 | 0.1 μfd, 50V, Ck 05 Bx 104 |
| C30 | 0.1 μfd, 50V, Ck 05 Bx 104 |
| C31 | 0.01 μfd, 500V, DISC CERAMIC |
| C32 | 0.1 μfd, 50V, Ck 05 Bx 104 |
| C33 | 0.1 μfd, 50V, Ck 05 Bx 104 |
| C34 | 1500 pf, 500V feed thru, 327-005 × 5U0 − 152 M |
| C35 | 1500 pf, 500V feed thru, 327-005 × 5U0 − 152 M |
| C36 | 1500 pf, 500V feed thru, 327-005 × 5U0 − 152 M |
| C37 | 1500 pf, 500V feed thru, 327-005 × 5U0 − 152 M |
| C38 | 1500 pf, 500V feed thru, 327-005 × 5U0 − 152 M |

TABLE 3

| SCR1 | 2N5060 SCR |
|---|---|
| SCR2 | 2N5060 SCR |
| U1/1 | ¼ LM 339, VOLTAGE COMPARATOR IC |
| U½ | ¼ LM 339, VOLTAGE COMPARATOR IC |
| U2/1 | ¼ LM 324, OP AMP IC |
| U2/2 | ¼ LM 324, OP AMP IC |
| U3 | UC 3825 PULSE WIDTH MODULATOR IC |
| D1 | 1N 4148 DIODE |
| D2 | 1N 4148 DIODE |
| D3 | 1N 4148 DIODE |
| D4 | 1N 4148 DIODE |
| Z1 | 1N 5235 A, ZENER DIODE, 6.8 V |
| Z2 | SB180, SCHOTTKY BARRIER RECTIFIER |
| Z3 | SB180, SCHOTTKY BARRIER RECTIFIER |
| Z4 | SB180, SCHOTTKY BARRIER RECTIFIER |
| Q1 | MPS 5179 TRANSISTOR |
| Q2 | 2N3866 TRANSISTOR |
| Q3 | MRF 237 TRANSISTOR |
| Q4 | MRF 1946 TRANSISTOR |
| Q5 | MRF 1946 TRANSISTOR |
| XTL1 | CRYSTAL, 3rd OT, 13.56, MH$_z$ |
| T1 | TRANSFORMER, FERRITE, 4:1 |
| T2 | TRANSFORMER, FERRITE, 1:3 |

TABLE 3-continued

| | |
|---|---|
| L1 | 15 μH, INDUCTOR |
| L2 | 15 μH, INDUCTOR |
| L3 | 15 μH, INDUCTOR |
| L4 | 4.7 μH, INDUCTOR |
| L5 | 15 μH, INDUCTOR |
| L6 | 15 μH, INDUCTOR |
| L7 | 15 μH, INDUCTOR |
| M1 | AMMETER, 0-50 μA |
| M2 | AMMETER, 0-50 μA |

The construction and operation of circuit 10 will be described beginning with RF generator 160 contained within the dashed line shown in FIGS. 12a and 12b. Transistor Q operates in the manner of a crystal controlled oscillator. Resistor R25, in combination with diodes D1 and D2 develop an initial voltage bias for a class AB turn on of transistor Q1. The voltage bias is applied to base 170 to create a bias current on the order of 5 milliamps through collector 172. Inductor L1 and capacitor C15 are connected to collector 172 at node 174. Inductor L1 offers a high impedance for an operating frequency of 40.68 megahertz (which frequency is a frequency assigned to this type of apparatus by the FCC) and a DC feed. Capacitor C12 and resistor R27 form a low pass filter. This low pass filter prevents spurious oscillations. Capacitors C13 and C14 are connected to emitter 176 at node 178 to form a voltage divider, which is part of a feed back circuit to sustain oscillation of crystal XTL1. Resistor R28 and inductor L2 present a high impedance in a manner similar to inductor L1 and resistor R27. A low level signal on the order of five to ten milliwatts is transmitted through capacitor C15 to base 180 of transistor Q2. A Class C bias is established for transistor Q2 by inductor L3 connected to ground 182; resistor R29 serves a stabilizing function. Inductor L4 is connected to collector 184 of transistor Q2 to supply a operating voltage similar to that provided by inductor L1 for transistor Q1. Emitter 186 is connected to ground 182. Capacitor C16 interconnects collector 184 with base 190 of transistor Q3. Point A of inductor L4 is interconnected with point A of conductor 192 extending from integrated circuit U3. The power gain through transistor Q2 is approximately 15 dB. This power is further amplified by transistor Q3. Resistor R30, connected between base 190 and ground 182, constitutes a bias network for transistor Q3. Output stage 194 is a push-pull amplifier, including transistors Q4 and Q5, coupled to collector 196 of transistor Q3 through transformer T1 and capacitor C17. Resistor R32 and capacitor C18, connected between base 198 and collector 200 of transistor Q4, along with capacitor C19 and resistor R32a, connected between base 202 and collector 204 of transistor Q5, form neutralizing networks about the base and collector of the respective transistors. These networks prevent output stage 194 (and RF generator 160) from producing spurious oscillations resulting from load mismatching and a varying supply voltage. The output power of output stage 194 is coupled through transformer T2. In addition, transformer T2 performs an impedance matching function by transforming an approximately 5 ohm outward impedance to a 50 ohm impedance. The output power of transformer T2 is coupled through capacitor C20 to a chassis mounted BNC connector. Inductors L6 and L7, in combination with capacitor C21 and C29, form a low pass filter 206. The low pass filter isolates the RF signals present on conductor 208 from a low voltage DC signal (TEMP SENS) provided by constant current source (5vREF/R43). Resistor R43, interconnecting conductor 210 with pin 16 of integrated circuit U3, supplies a constant current through inductors L7 and L6 to conductor 208 connected to the BNC connector, which connector is electrically attached to a length of coaxial cable 212. The power output transmitted through coaxial cable 212, reflectometer 164 and present at the output BNC connector may be in the range of 20 to 40 watts.

Reflectometer 164 is an industry standard circuit and is available as an off the shelf item. It includes a length of coaxial cable 214, designated as RG58, with two insulated wires 216,218 extending through the coaxial cable. The input power and reflected power is sampled by the current generated through wires 216,218. The AC signals present upon these wires are rectified by diodes D3 and D4 and filtered by capacitors C23 and C25. Variable resistor R33 with resistor R34 and variable resistor R36 with resistor R37 permit calibration of the signals sampled. These signals are passed through capacitors C24 and C27 to respective micro ammeters M1 and M2.

The power output of RF generator 160 is controlled by integrated circuit U3, which functions as a pulse width modulator. Transistor Q2 is turned on and off by applying through conductor 220 (point A) and inductor L4 a pulse train of varying width pulses having a voltage of approximately 12 volts. Conductor 192 is connected to pins 11 and 14 of integrated circuit U3 through Schottky barrier diodes Z2 and Z3. Diode Z4 forms the function of preventing the integrated circuit's substrate from becoming back biased. To reiterate, integrated circuit U3 forms a series of pulses at a constant frequency but with varying modulated pulse widths. The wider the pulse widths the greater the averaged output power. The peak instantaneous power will remain constant but the average output power is a function of the duty cycle of the pulse train. The pulse width is varied by the voltage level of the signal applied to pin 1 through conductor 220 (Control). Capacitor C34 filters the applied DC control signal and the control signal is further isolated and filtered by a resistor. The combination of resistor R40 and capacitor C32 interconnecting pin 1 with pin 3 forms a frequency compensation network. It is used to stabilize the feedback system and to prevent the regulating system from oscillating. Resistor R39 connecting pin 5 to ground and capacitor C31 connecting pins 6 and 7 to ground form a timing network that controls the frequency of oscillation. Pin 1 is a non inverting input. An input signal (TEMP SET) is provided by conductor 222 to pin 2 (a non inverting input) through capacitor C36, which signal is a reference signal or reference voltage. The voltage is developed by a panel mounted potentiometer R44 and applies 0 to 2.5 volts representative of a temperature preset. The resulting input or reference signal on pin 2 of integrated circuit U3 will produce pulses having a certain width to produce an output power level resulting in probe heating and voltage change until the digital volt meter (DVM) indicated voltage matches the reference voltage (representative of the temperature preset TEMP SET). Pin 9, connected to conductor 224 performs a shut off function when the voltage on conductor 224 approaches 1 volt. Resistor R41, connecting conductor 224 to ground, is used for biasing purposes. In the event that no cable is connected to pin 9, integrated circuit U3 will continue to function.

A temperature sensing signal (TEMP SENS) is present on conductor 210 and is passed through capacitor C38 to monitor and control circuitry 162 (TEMP SENS). It may be noted that conductor 224 interconnects with the monitor and control circuitry (SHUT DOWN) through resistor R24 also.

The components and functions of monitor and control circuitry 162 will be now described. A battery low monitor is provided by a signal present on conductor 226, which conductor is connected to a light emitting diode (LED) via a feed through capacitor C3. This circuit is activated when the supply voltage (+12V) drops to approximately 10 volts. Integrated circuit U1, section 1 (U1/1) is a comparator. A reference 5 volt signal (5V REF) is applied to pin 4 of integrated circuit U1/1 through conductor 228. This 5 volt reference signal is supplied by IC U3 at pin 16 and is transmitted through conductor 228. Zener diode Z1 is connected to pin 5 of integrated circuit U1/1 along with one side of resistor R1 to perform a bias. When the 12 volt supply voltage drops to approximately 10 volts, the bias voltage at pin 5 drops below 5 volts and integrated circuit U1/1 provides a high signal at output pin 2. Resistor R2, interconnecting the 12 volt supply voltage with pin 2, functions as a pull up resistor. The signal present at pin 2 is transmitted through resistor R3 to gate 230 of silicon controlled rectifier SCR1. It may be noted that resistor R3, in combination with capacitor C2, form a low pass filter, which filter slows down the reaction time of SCR1 and renders it less susceptible to high frequency noise. Resistor R5 provides a sustaining current once the SCR1 has been triggered.

Amplifiers U2/1 and U2/2 are two stages of an operational amplifier U2. These two stages of amplifiers have two functions. The first stage (U2/1) is a straight amplifier to compensate for the slope of the load ($R_L$). The second function is that of offsetting parasitic resistance represented by coaxial cable 142 attendant the catheter. The gain or amplification of amplifier U2/1 attendant pins 1, 2 and 3 is controlled and retained constant by resistors R7 and R8 along with the relative value of resistor R6 interconnecting pin 3 with conductor 210 (TEMP SENS). Capacitor C6 provides compensation and prevents unwanted noise through the amplifier. Resistor R6 and capacitor C5 form a low pass filter. The input to amplifier U2/1 is provided by conductor 210 through feed through capacitor C4 and resistor R6 to pin 3. The input is amplified and developed at pin 1. Conductor 232 interconnects pin 1 of amplifier U2/1 with pin 12 of amplifier U2/2. Amplifier U2/2 has the function of both amplification and offset. That is, it permits zeroing out the DC resistance presented by the coaxial cable or coaxial feed system since this resistance remains constant and essentially will not vary with temperature. This zeroing out function is performed by potentiometer R10 in combination with resistors R9, R11, R12 and R13. Resistor R45 interconnecting pin 13 and pin 14 provides feedback to control the gain of the amplifier. The output signal at pin 14 of amplifier U2/2 is fed through capacitor C39 to a digital volt meter (DVM), which permits calibration of the output signal. The output signal is also transmitted through resistor R14 and capacitor C8 as a control signal on conductor 220 (CONTROL), which conductor is connected to the control input through capacitor C34 of RF generator 160.

The final output from pin 14 of amplifier U2/2 is routed to the second stage of comparator U1/2 which serves as a safety cut off. It is a comparator wherein a preset temperature level is set by resistors R18,R20 and potentiometer R19 in combination with resistor R17 connected to pin 6. When the voltage on pin 7 matches that on pin 6, the output at pin 1 goes high and current will be applied through resistor R21 to gate 234 of silicon controlled rectifier SCR2 to cause it to fire. Resistor R23 provides a sustaining current bias source. Cathode 236 of SCR2 produces a positive 12 volt signal which is routed through resistor R24 as an output on conductor 224. Conductor 224 is connected to pin 9 (SHUT DOWN) of integrated circuit U3 through capacitor C35. The presence of a 12 volt signal at pin 9 will shut down integrated circuit U3 and further generation of RF energy is prevented.

In summary, RF generator 160 generates a variable output power of RF frequency at 40.68 megahertz (or another selected frequency upon corresponding change of component values). It is battery operated and produces power in the range of zero to 40 watts. The power output is routed through a wrapping of one of the molds, which wrapping has an ohmic resistance. It is the property of metallic loads or loads having ohmic resistance to change value with temperature. RF generator circuit 160, monitor and control circuit 162 and reflectometer 164 apply power simultaneously with the measurement of the resistance change of the load due to temperature. That is, power is applied to heat the load simultaneously with a monitoring of the amount by which the load is heated by noting the change in load resistance. The monitor and control circuitry converts a low level DC signal to an actual temperature reading by performing a fixed amount of amplification and fixed off set caused by the DC resistance of the coaxial cable and other conductors. Any error signal (the difference between the desired temperature and the actual temperature) developed is fed to a pulse width modulator to regulate the energy output to the load and, therefore, the temperature of the load.

While the principles of the invention have now been made clear in an illustrative embodiment, there will be immediately obvious to those skilled in the art many modifications of structure, arrangement, proportions, elements, materials and components used in the practice of the invention which are particularly adapted for specific environments and operating requirements without departing from those principles.

We claim:

1. Apparatus for melting, shaping, forming and welding thermoformable elements with RF energy, said apparatus comprising in combination:
    a) a mold having a mold cavity for receiving a thermoformable element;
    b) a source for generating RF energy,;
    c) means ohmicly resistively and thermally responsive to RF energy for heating said mold cavity and any thermoformable element disposed therein;
    d) means for transmitting the RF energy to said heating means;
    e) means for setting the temperature of said heating means extrinsic of said heating means and as a function of the temperature at which thermoforming of the thermoformable element will occur; and
    f) means for modulating the RF energy transmitted as a function of the temperature of said heating means commensurate with the setting of said temperature setting means to maintain the thermoformable element at its thermoforming temperature.

2. The apparatus as set forth in claim 1 wherein said heating means comprises an ohmicly resistive conductor.

3. The apparatus as set forth in claim 1 wherein said heating means comprises a pair of ohmicly resistive conductors.

4. The apparatus as set forth in claim 3 wherein said pair of conductors encircle said mold cavity.

5. The apparatus as set forth in claim 4 wherein said mold includes at least one layer of heat conductive material for defining said mold cavity.

6. The apparatus as set forth in claim 5 wherein said pair of conductors encircle said at least one layer.

7. The apparatus as set forth in claim 6 including a plurality of said layers of heat conductive material.

8. A mold for use in conjunction with a source of RF energy to melt, shape, form or weld any thermoformable element placed within a mold cavity of said mold, said mold comprising in combination:
  a) at least one substrate for defining the mold cavity, said substrate being sufficiently thermally conductive to provide a temperature gradient thereacross of inconsequential variation for purposes of uniformly transmitting heat to the thermoformable element disposed within the mold cavity;
  b) a wrapping of ohmicly resistive material disposed about said at least one substrate; and
  c) means for interconnecting said wrapping with the source of RF energy, said wrapping being thermally responsive to RF energy transmitted by said interconnecting means from the source of RF energy to said wrapping to transmit heat uniformly to the thermoformable element through said substrate.

9. The apparatus as set forth in claim 8 wherein said substrate comprises a metallic shell.

10. The apparatus as set forth in claim 8 wherein said substrate comprises polyimide.

11. The apparatus as set forth in claim 8 wherein said substrate comprises a plurality of substrate layers.

12. The apparatus as set forth in claim 11 wherein each substrate layer of said plurality of substrate layers is a layer of polyimide.

13. The apparatus as set forth in claim 11 wherein said wrapping encircles said plurality of substrate layers radially outwardly.

14. The apparatus as set forth in claim 13 wherein said wrapping comprises a pair of electrical conductors.

15. Apparatus for shaping, melting, forming or welding thermoformable elements with RF energy from a source of RF energy, said apparatus comprising in combination:
  a) a thin wall mold for defining a mold cavity to receive a thermoformable element, said mold cavity being commensurate in shape with the final configuration of the shaped, melted, formed or welded thermoformable element;
  b) an ohmicly resistive load encircling said mold cavity for heating the contents of said mold cavity;
  c) means for applying RF energy from the source of RF energy to said load to heat said load commensurate with the RF energy applied;
  d) means extrinsic to said load for setting the temperature of said load as a function of the temperature at which thermoforming of the thermoformable element will occur; and
  e) means for modulating the RF energy applied from the source of RF energy to maintain said load at a temperature commensurate with the setting of said temperature setting means to perform thermoforming of the elements.

16. The apparatus as set forth in claim 15 wherein said load comprises a pair of electrical conductors.

17. The apparatus as set forth in claim 15 wherein said modulating means is a function of a temperature dependent change in ohmic resistivity of said load.

18. The apparatus as set forth in claim 17 wherein said load comprises a pair of electrical conductors.

19. The apparatus as set forth in claim 17 wherein said thin wall mold comprises at least one layer of a substrate.

20. The apparatus as set forth in claim 17 wherein said thin wall mold comprises a plurality of layers of polyimide.

21. Apparatus for melting, forming, welding or shaping a thermoformable element with RF energy, said apparatus comprising in combination:
  a) a mold having a mold cavity for receiving the heat formable elements;
  b) an ohmicly resistive load thermally responsive to RF energy for applying heat to the mold cavity;
  c) means for transmitting the RF energy to said load;
  d) means extrinsic to said load for setting the temperature of said load; and
  e) means for modulating the RF energy transmitted to said load in response to said temperature setting means to permit selection of a presettable temperature for accommodating thermoformable elements having different thermoforming temperatures and to maintain said load at the selected preset temperature for melting, forming, welding or-shaping the thermoformable element.

22. The apparatus as set forth in claim 21 wherein said mold includes at least one layer of a heat transmissive substrate for defining the mold cavity.

23. The apparatus as set forth in claim 22 wherein said at least one layer includes a layer of polyimide.

24. The apparatus as set forth in claim 22 wherein said at least one layer includes a plurality of layers.

25. The apparatus as set forth in claim 24 wherein each of said layers is a coated layer of polyimide.

26. The apparatus as set forth in claim 22 wherein said load encircles said at least one layer.

27. The apparatus as set forth in claim 26 wherein said at least one layer includes a plurality of layers.

28. The apparatus as set forth in claim 27 wherein each of said layers is a coated layer of polyimide.

29. Apparatus for melting, shaping, forming or welding thermoformable elements with RF energy from a source of RF energy, said apparatus comprising in combination:
  a) a thin wall mold for defining a mold cavity to receive the thermoformable elements, said mold including at least a thermally conductive substrate for defining said mold cavity;
  b) an ohmicly resistive load thermally responsive to RF energy for applying heat directly and uniformly to said substrate to heat said mold cavity defined by said substrate, said mold including a section extending inwardly from said load toward said mold cavity, said section being sufficiently thermally conductive to provide a temperature gradient thereacross of inconsequential variation for purposes of uniformly transmitting heat to the thermoformable element disposed within said mold cavity; and c) means for transmitting RF energy from the source of RF energy to said load.

30. The apparatus as set forth in claim 29 wherein said substrate comprises polyimide.

31. The apparatus as set forth in claim 29, wherein said substrate includes a plurality of layers.

32. The apparatus as set forth in claim 31 wherein each layer of said plurality of layers is a layer of polyimide.

33. The apparatus as set forth in claim 29 wherein each said substrate comprises material having a higher melt temperature than the melt temperature of the thermoformable element.

34. The apparatus as set forth in claim 29 wherein said load circumscribes said mold cavity radially outwardly of and adjacent to said substrate.

35. The apparatus as set forth in claim 29 wherein said substrate is a metal.

36. A method for forming a mold for use with a source of RF energy to shape, form or weld a thermoformable element disposed within a mold cavity of the mold, said method comprising the steps of:
   a) developing a mandrel conforming in configuration with the mold cavity to be formed;
   b) coating the mandrel with at least one layer of a substrate;
   c) removing the mandrel to form the mold cavity within the substrate;
   d) wrapping the substrate with an ohmicly resistive element; and
   e) providing means for interconnecting the wrapping of the ohmicly resistive element with the source of RF energy.

37. The method as set forth in claim 36 wherein said step of removing includes the step of etching.

38. The method as set forth in claim 36 wherein said step of coating includes the step of coating a plurality of layers of substrate upon the mandrel.

39. The method as set forth in claim 38 wherein the substrate is polyimide and wherein said step of coating comprises the step of coating the polyimide upon the mandrel.

40. The method as set forth in claim 36 wherein said step of wrapping includes the step of wrapping a twisted pair of wires about the substrate.

41. The method as set forth in claim 36 including the step of enveloping the substrate and the wrapped ohmicly resistive element within a form.

42. A method for melting, shaping, forming or welding a thermoformable element with RF energy from a source of RF energy, said method comprising the step of:
   a) locating the element to be thermoformed within a mold cavity of a mold;
   b) heating the mold cavity with an ohmicly resistive load responsive to RF energy received from the source of RF energy;
   c) transmitting RF energy to the load;
   d) setting the temperature of said load extrinsic of said load as a function of the temperature at which thermoforming of the thermoformable element will occur; and
   e) modulating the RF energy transmitted as a function of the temperature of the load commensurate with the temperature set to maintain the element at its thermoforming temperature.

43. The method as set forth in claim 42 including the step of conveying heat from the load to the element across a thin wall mold.

44. The method as set forth in claim 42 including the step of conveying heat from the load to the thermoformable element across a substrate.

45. The method as set forth in claim 44 wherein said step of conveying is carried out across a coated substrate.

46. Apparatus for melting shaping, forming or welding thermoformable elements with RF energy from a source of RF energy, said apparatus comprising in combination:
   a) a thin wall mold for penetrable engagement with a thermoformable element, said mold including at least one layer of a thermally conductive substrate for engaging the thermoformable element;
   b) an ohmicly resistive load thermally responsive to RF energy for applying heat to said layer to heat the interior of the thermoformable element; and
   c) means for transmitting RF energy from the source of RF energy to said load.

47. The apparatus as set forth in claim 46 wherein said substrate comprises a coating of polyimide.

48. The apparatus as set forth in claim 47 wherein said load comprises a wrapping of electrical conductors.

49. The apparatus as set forth in claim 47 wherein said load comprises a twisted pair of conductors.

50. The apparatus as set forth in claim 49 including a radial flange disposed externally of the thermoformable element for supporting said mold.

* * * * *